May 8, 1923.
G. T. WROUGHTON
TRAFFIC SIGNAL OPERATING MECHANISM
Filed May 25, 1922
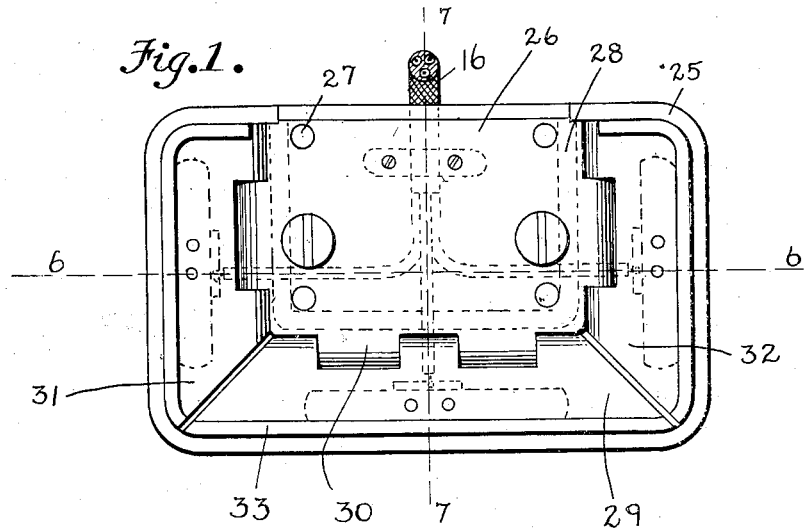
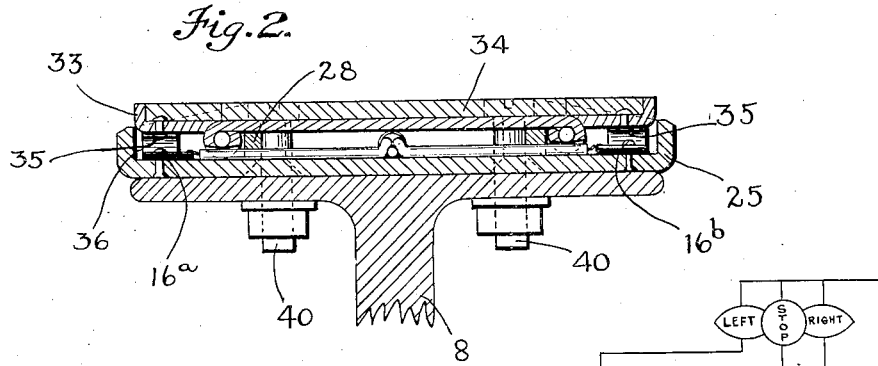
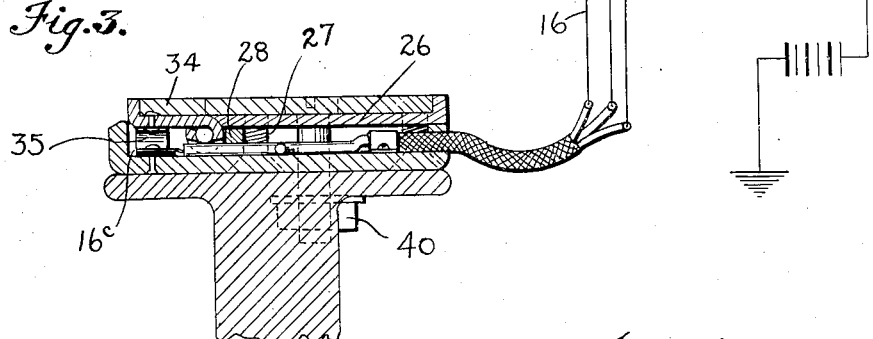
Inventor
George T. Wroughton.
by Hazard & Miller
Attorneys Patented May 8, 1923.

1,454,808

UNITED STATES PATENT OFFICE.

GEORGE T. WROUGHTON, OF LOS ANGELES, CALIFORNIA.

TRAFFIC-SIGNAL-OPERATING MECHANISM.

Application filed May 25, 1922. Serial No. 563,545.

*To all whom it may concern:*

Be it known that I, GEORGE T. WROUGHTON, a citizen of the United States, residing at Los Angeles, in the county of Los Angeles and State of California, have invented new and useful Improvements in Traffic-Signal-Operating Mechanisms, of which the following is a specification.

This invention relates to vehicle signals and has for its object to provide a traffic signal operating and controlling means that may be readily combined with the usual structural elements of a motor vehicle, such, for instance, as an automobile.

An object of the present invention is to provide a set of independently operable signal lamp controls associated with the usual brake pedal of an automobile in such manner that when the brake pedal is operated, one or the other of the signal lamp controls can be concurrently operated so as to indicate an intended change in direction of travel of the vehicle. Further, an object is to provide for the energization of the direction signal independently of action of the brake pedal.

Other objects will be made manifest in the following specification of embodiment of the invention illustrated in the accompanying drawings, in which:

Fig. 1 is a plan showing another form of the invention.

Fig. 2 is a longitudinal section on line 2—2 of Fig. 1.

Fig. 3 is a transverse section on line 3—3 of Fig. 1.

The present invention consists of a combination of manually closed switch devices having suitable electric circuits comprising as elements signal lanterns for giving signals of changing direction and stopping of a vehicle.

An embodiment of the invention is shown in Figs. 1 to 3 inclusive wherein there is mounted upon the top of the usual brake lever 8, a triple switch mechanism by which may be energized one or the other of the signals "Left," "Stop" and "Right," Fig. 3, or combinations of the same.

The triple switch mechanism may be contained within a comparatively thin box or shell 25 of suitable form and which is adapted to be secured upon the head of the pedal 8. The box 25 has upturned marginal flanges, and in the front and central portion of the box there is secured a fixed cap plate 26 which may be fastened down upon the bottom of the box 25 and in spaced relation thereto as by means of countersunk screws 27 passing up through the bottom of the box. The cap plate 26 may be spaced by suitable flange or frame means 28 resting on the bottom of the box. Upon the rear longitudinal edge of the plate 26 there is provided a leaf 29 which may be hinged as at 30 to the plate 26. The ends of the leaf 29 are shown as mitred and complementary to the contiguous mitred ends of a left hand leaf 31 and a right hand leaf 32 which are respectively hinged to the ends of the plate 26. The rear edge of the plate and the leaves mentioned are provided with upturned flanges as 33, and these form a shallow recess in which is laid a suitable cover piece as a section of rubber mat 34, or other suitable material. This mat is shown in Figs. 2 and 3, but is omitted from Fig. 1 so that the arrangement of the hinged leaves 29, 31 and 32 may be clearly shown.

Each of the leaves is provided with a contact button 35 on its lower surface, and each leaf is normally maintained in an elevated position as by a respective spring 36 so that the contact buttons of the leaves are held out of contact with respective contiguous terminals of lamp circuits each connected to respective lanterns "Left," "Stop" and "Right." The contact buttons 35 of the several switch leaves are grounded in the circuit and from each of the lamps leads a wire 16 having a terminal disposed in the switch box 25. For instance, under the left switch leaf 31 there is provided a terminal 16$^a$ and under the right switch leaf 32 there is provided a terminal 16$^b$, and under the central longitudinal leaf 29 there is provided a terminal 16$^c$ so that upon the depression of any one of the leaves its respective connected signal lantern will be energized.

By this form of the invention it is possible to mount all of the switches immediately upon the head of the pedal lever 8 and therefore the selection of any one of the combination of the signal devices is secured by direct action upon the pedal 8.

The switch box in its completely assembled form may be readily attached to and removed from the pedal 8 as by means of cap screws 40 passing through the head of the pedal.

Various modifications and changes may be resorted to within the spirit of the invention as claimed.

What is claimed is:

1. A triple switch mechanism including a box having a flanged bottom adapted to be mounted upon a brake pedal and said box being provided with a set of three flat switch closing leaves in a common plane and which may be operated individually or in suitable co-ordination, the flange of the bottom surrounding the leaves.

2. A triple switch including a box having a flat bottom adapted to be mounted upon a brake pedal, the box having a flat fixed top and three flat leaves hinged around the same, each forming a circuit closer for respective circuits.

3. A triple switch including a box adapted to be mounted upon a brake pedal, the box having a fixed top with leaves hinged around the same in a common plane, each forming a circuit closer for respective circuits, certain of the leaves being at the end of the box in right and left hand positions, and the other leaf being along one side of the box.

4. A triple switch including a box adapted to be mounted upon a brake pedal, the box having a fixed flat top with flat hinged leaves all in the plane of the top, each forming a circuit closer for respective circuits, certain of the leaves being at the end of the box in right and left hand positions, and the other leaf being along the rear side of the box.

5. A triple switch including a plate attachable to the top of a brake pedal and having a fixed flat top plate, circuit terminals arranged under the top plate, flat leaves yieldingly hinged to the top plate and in a common plane therewith, and terminal contacts disposed below the leaves to be electrically engaged thereby for completing circuits.

In testimony whereof I have signed my name to this specification.

G. T. WROUGHTON.